A. McCarter,
Meat Chopper.
No. 97,946. Patented Dec. 14, 1869.
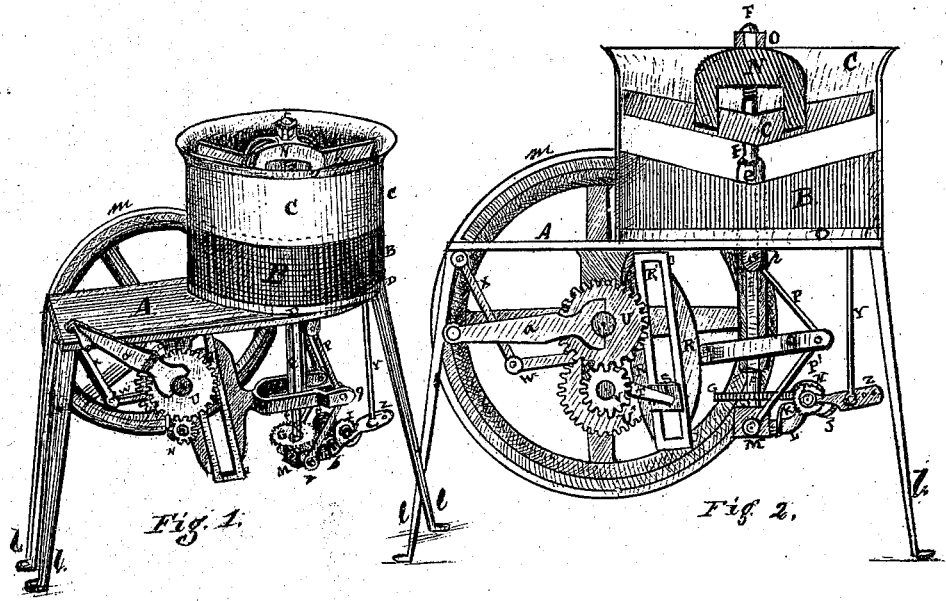
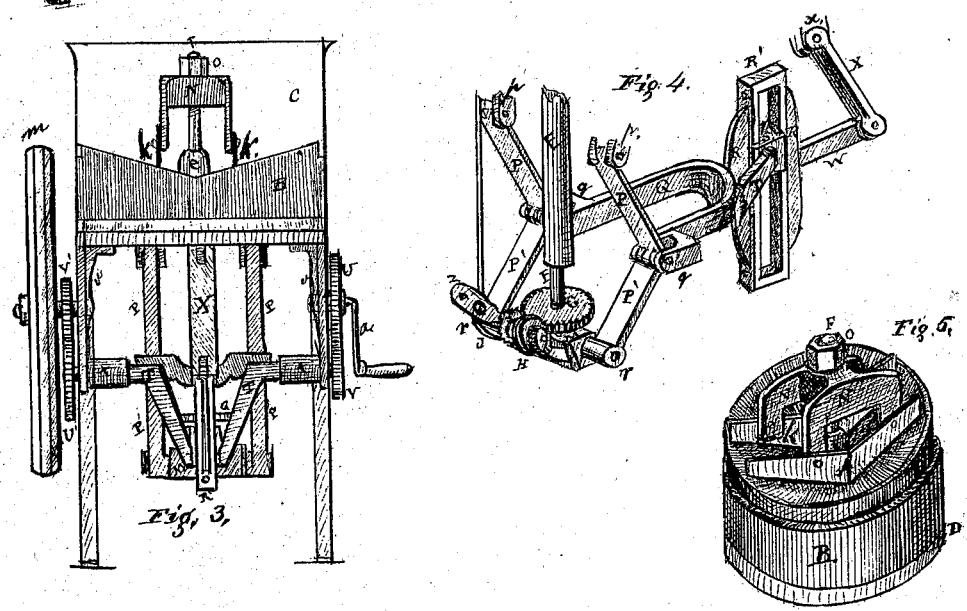
Witnesses.
Marmaduke Wilson
Samuel McCarter
Inventor.
Arthur McCarter

United States Patent Office.

ARTHUR McCARTER, OF SALEM, OHIO.

Letters Patent No. 97,946, dated December 14, 1869.

IMPROVED MEAT-CHOPPER.

The Schedule referred to in these Letters Patent and making part of the same.

I, ARTHUR McCARTER, of Salem, in Columbiana county, and State of Ohio, have invented certain Improvements in Meat-Mincing or Chopping-Machines, of which the following is a specification.

The nature of my invention relates to the combination of a pair of knives or cutters, with a rounded or bevel edge, so mounted and operated that a vertical or up-and-down motion is imparted, and, also, a rotary motion upon a central axis, so timed as to turn, say five to ten degrees, when the knives are raised out or above the meat for a fresh cut, thus, after successive cuts, to traverse around, making the entire revolution of the stationary block, with its chopping-bed inclined at an angle, say, of five to ten degrees to the centre, (or some arc of a circle dished to or from the circumference,) by a novel arrangement of the mechanism, to produce the combined vertical and rotary motion on the central shaft to which the knives are affixed.

Figure 1 is a perspective view of my machine.

Figure 2, a side elevation, showing the knives in the cylindrical hopper.

Figure 3, an end elevation, to show the side gearing, &c.

Figure 4, some of the mechanism detached from the table or bed.

Figure 5, the block and knives, with the cylindrical hopper removed.

A is the bed or table, supported on the legs $l$.

D is a ring or sunken portion to receive the block B, which has a shouldered offset around the upper circumference for the cylindrical hoppor C, and is also centrally perforated for a tubular shaft, E, which is held by its head $e$, and stationary, as is also the block B.

The shaft F, that sustains the knife-head N, passes through the tube E, and rests upon a square step, M.

This step has a projection on both sides, to which the links P' P' are connected for a pivot.

Two similar links, P P, are also affixed on pivots to lugs $p$, beneath the table A, and jointly hinged together centrally, and held on pivot-bolts in the slotted ends $q$ of the forked piece Q, partly embracing the tubular shaft E on its back motion, and drawing the united link-pieces, P' P' and P P, centrally forward, and pushing them back, thereby shortening the distance between the fixed points at $p$ and $r$, both in a perpendicular line with the shaft E F, giving the step, with its appendages, an up-and-down motion.

This is produced by connecting the forked piece Q on one side of an oblong slotted bar or guide-piece R. The parallel sides guide the sliding block S with its flanged sides.

Through this block S the crank T passes, the revolving motion of which carries the guide-piece back and forth horizontally.

The jointed arms W X are also connected to the guide-piece R, and the upper end of X, held by a pivot in a lug, $x$, centrally affixed to the hind end of the table, underneath.

A handle, $a$, to the cog-wheel U, meshes into a pinion, V, having its bearings in brackets $u$.

The crank-shaft T is operated by the pinion V, and operates the cogged wheel U' on the opposite side, and a pinion, V', on the hub of a fly-wheel, $m$, which is fastened by a stud-pin, in order to give any desired amount of speed. By this arrangement of the gearing, great power is also gained thereby, in combination with the links fixed at two points, so that when the resistance comes on the knives, the pressure is all upward on the links; hence, by this peculiar motion, any amount of speed can be applied or given to the knives, gaining in power, also, by reducing the comparative size in the wheels for getting this motion or speed on the knives.

The vertical motion of the knife-shaft, by means of the oscillating jointed levers and guide-way and action of the crank, being understood, it remains to explain how the rotary motion to the knives is imparted. To the step M, (that supports the shaft F, which has a cogged wheel, G, fixed to it,) are side brackets, $b$, for the bearings of a screw-pinion, H, which meshes into the cogged or toothed wheel G on the shaft F. The ratchet-wheel I, with its pawls J K, revolves the screw-wheel or pinion intermittently by the intervention of a vibrating arm, $z$, to which one of the pawls J is connected. (The other pawl, K, is attached to the step M.) A rod, Y, fastened above, under the bed or table A, is connected by a pivot-bolt to the arm $z$, which operates on the shaft that supports the worm H. By moving this rod Y further out on the arm $z$, less motion is given to the knives, and is a means of regulating them to cut coarser or finer, and constitutes an adjustable feed and intermittent revolving motion, without interfering with the up-and-down motion, which gives four cuts to each revolution of the crank.

The bevel or rounded dish of the block, and lance or shear-shape of the cutting-edge of the knives $k$, attached to their supporting-head N, to the top of the shaft F, which has a screw-end for the binding-nut $o$, is also a novel feature.

The action of the knives, I deem important and new. The manner of imparting a more or less rotary motion intermittently, just when the knives are raised up out of the meat, the link motion, and gearing of the crank and fly-wheel, have new and valuable features.

I am aware that knives vibrating up and down, for mincing meat, by means of a crank-shaft, in combination with a circular revolving tub or block, have been used before. I, therefore, do not claim the reciprocating vertical knife-shaft, operated by a crank and central guide tube, combined with a toothed rim and loose pinion, for such I do not use.

What I claim, as my invention, is—

1. The vibrating arm $z$, adjustable rod Y, ratchet-wheel I, pawls J K, for operating the worm H, in combination with wheel G, shaft F, and knives $k$, when constructed and arranged to operate as herein described, for the purpose set forth.

2. In combination with the jointed links P P', jointed arms W X, and guide-way R', operated by the crank-shaft T and sliding block S, the arrangement of the gearing U U' X, $v$ $v'$, in connection with the fly-wheel $m$, as herein described, for the purpose specified.

ARTHUR McCARTER.

Witnesses:
MARMADUKE WILSON,
SAMUEL McCARTER.